(No Model.) 2 Sheets—Sheet 1.
G. McBEAN.
SHINGLE TRIMMING MACHINE.
No. 436,145. Patented Sept. 9, 1890.
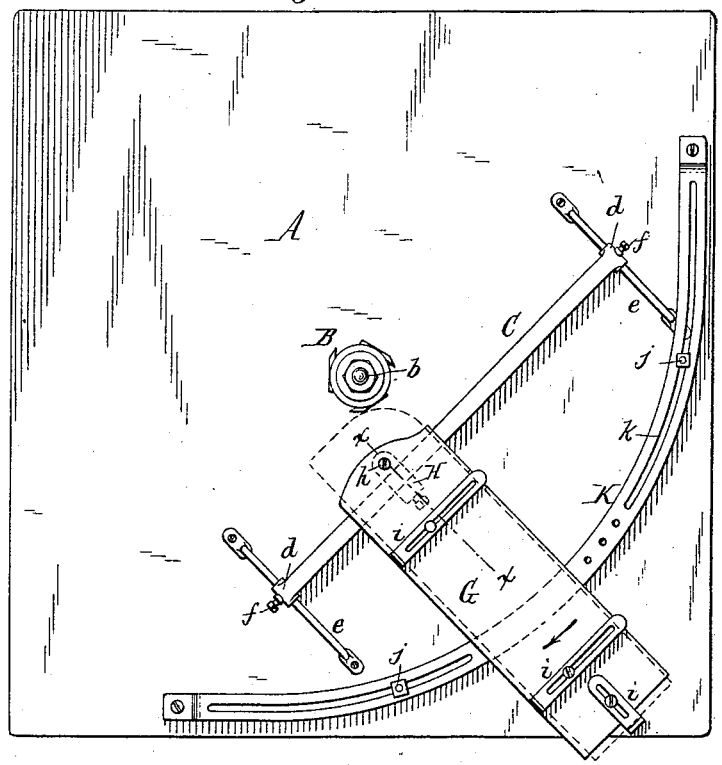
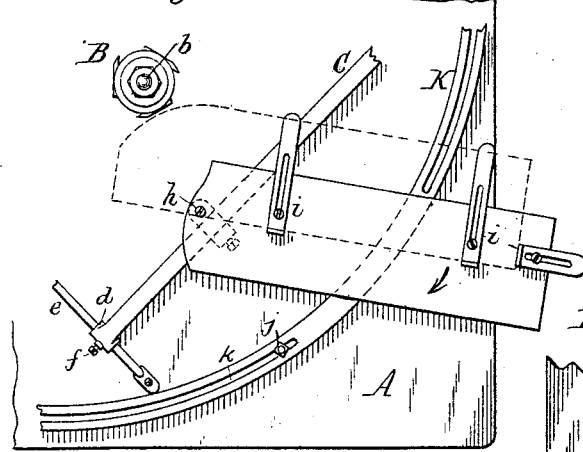
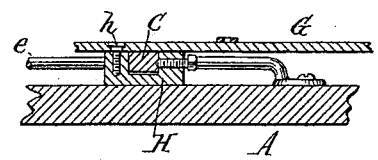
 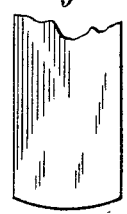 
Witnesses
Emil Neuhart
Jacob Nussenblatt
George McBean Inventor.
By Wilhelm Bonner
Attorneys (No Model.) 2 Sheets—Sheet 2.
G. McBEAN.
SHINGLE TRIMMING MACHINE.
No. 436,145. Patented Sept. 9, 1890.
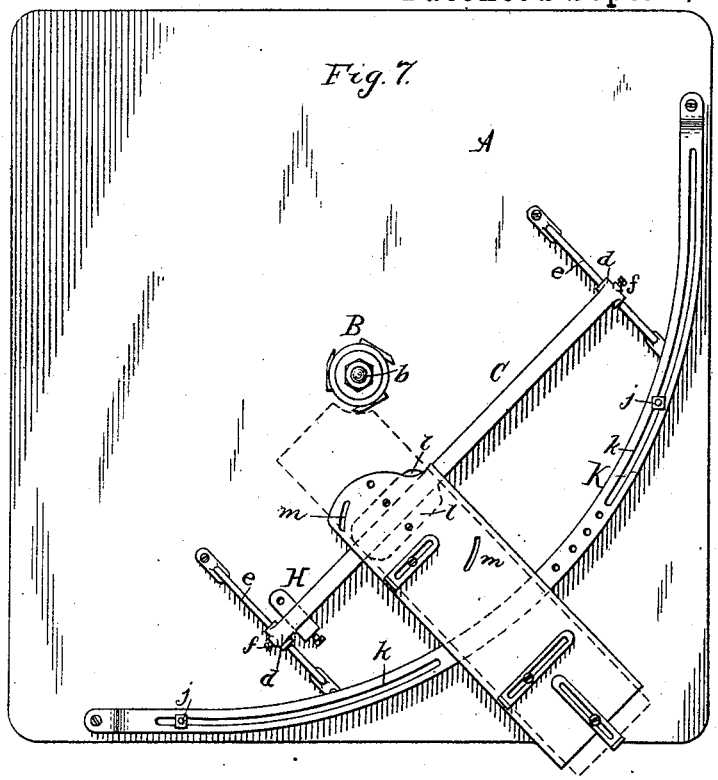
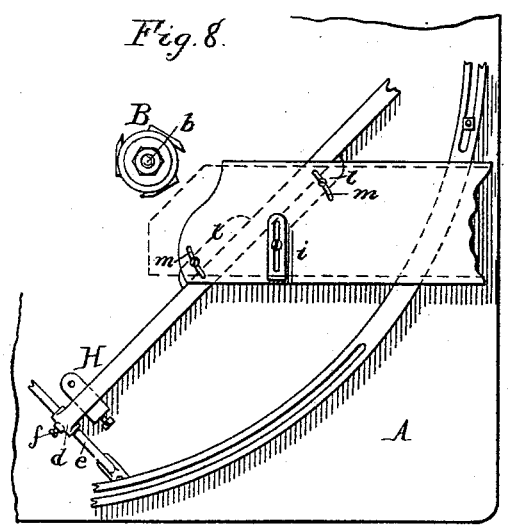
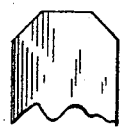
Witnesses:
Emil Neuhart
Jacob Nussenblatt
George McBean Inventor
By Wilhelm Bonner
Attorneys.

UNITED STATES PATENT OFFICE.

GEORGE McBEAN, OF TONAWANDA, NEW YORK, ASSIGNOR OF ONE-HALF TO CHARLES H. AKERLEY, OF SAME PLACE.

SHINGLE-TRIMMING MACHINE.

SPECIFICATION forming part of Letters Patent No. 436,145, dated September 9, 1890.

Application filed April 25, 1890. Serial No. 349,492. (No model.)

*To all whom it may concern:*

Be it known that I, GEORGE McBEAN, a citizen of the United States, residing at Tonawanda, in the county of Niagara and State of New York, have invented new and useful Improvements in Shingle-Trimming Machines, of which the following is a specification.

This invention relates to a machine for shaping and trimming the ends of wooden shingles, and has for its object to construct a simple machine whereby the ends of the shingles may be rapidly and uniformly rounded, chamfered, or pointed to any desired angle or curvature.

In the accompanying drawings, consisting of two sheets, Figure 1 is a top plan view of my improved machine, showing the same adjusted for cutting the end of the shingle to a semicircular form. Fig. 2 is a similar view showing the machine adjusted for producing a pointed shingle. Fig. 3 is a cross-section in line $x$ $x$, Fig. 1, on an enlarged scale. Figs. 4, 5, and 6 are fragmentary views of ornamental shingles produced by the construction of machine illustrated in Figs. 1, 2, and 3. Figs. 7 and 8 are top plan views showing modified forms of the carriage. Figs. 9, 10, and 11 are fragmentary views of ornamental shingles produced by the form of machine represented in Figs. 7 and 8.

Like letters of reference refer to like parts in the several figures.

A represents the bed of the machine, supported in any suitable manner, and B is a rotary horizontal cutter arranged above the bed A. This cutter is mounted upon a vertical shaft $b$, which projects through the bed and is driven in any convenient way.

C represents a guide bar or way arranged on one side of the cutter-head, tangentially to the same, and which is adjustable toward and from the cutter. This guide-bar is provided at its ends with sleeves or collars $d$, which slide upon raised supporting-rods $e$, secured to the top of the bed A at right angles to the guide-bar. The guide-bar is adjustably secured to these supporting-rods by set-screws $f$, arranged in threaded openings in its sleeves and bearing against the rods.

Referring to Figs. 1, 2, and 3, G represents a shingle tray or carriage, in which the shingles to be trimmed are placed. The carriage is pivoted centrally at its front end to a block or support H, arranged upon the guide-bar C, so that it may be swung in either direction on opposite sides of its pivot. The support or block H is capable of adjustment lengthwise of the bar, and is provided with a set-screw for securing it in place on the bar. This support is provided in its upper side with an opening or socket for receiving the pivot of the carriage, which pivot preferably consists of a screw $h$, secured to the front end of the carriage, as shown. The tray or carriage G is provided with adjustable end and side gages $i$ $i$, against which the shingle or shingles to be trimmed are placed. The front end of the carriage is cut away to clear the cutter and allow the shingles to project beyond the tray.

$jj$ represent adjustable stops arranged upon the bed in the path of the swinging carriage, and whereby the movement of the latter is properly limited. These stops preferably consist of bolts arranged in curved slots $k$, formed in a segmental bar K, secured to the top of the table. This bar is raised above the surface of the table and forms a support upon which the free rear portion of the carriage slides in trimming the shingles.

When it is desired to cut the ends of the shingles to the rounded or semicircular shape represented in Fig. 1, the gages $i$ $i$ of the carriage are so adjusted that the longitudinal center-line of the shingle placed on the carriage passes through the pivot of the carriage. The carriage is then swung on its pivot in the direction of the arrow in Fig. 1, whereby the adjacent corner of the shingle is removed by a curved cut which is concentric with the pivot of the carriage and extends to the middle of the shingle. The tray is then returned to its former position, the shingle is reversed in the tray, and its opposite corner trimmed in a similar manner. By adjusting the guide-bar C farther away from the cutter a smaller portion of the corner of the shingle is cut away and the end of the shingle is given the form shown in Fig. 2.

In order to give the shingle a more or less pointed end, as represented in Fig. 6, it is necessary to cut away the corners of the shingle by two reverse curves intersecting each other. For this purpose the gages of the carriage are so adjusted that the longitudinal center-line of the shingle stands on one side of the pivot of the carriage, as represented in Fig. 2, so that the radius of the arc produced on the end of the shingle by the cutter is greater than half the width of the shingle, and the pivot-support H is adjusted in the guide-bar so that the distance from the pivot of the carriage to the latter corresponds to the radius of the curve to be cut on the end of the shingle. Upon swinging the carriage on its pivot in the direction of the arrow one corner of the shingle is trimmed and the shingle is then reversed in the tray and its other end trimmed, as before described.

By properly adjusting the guide bar C, pivot-support H, and gages $i\ i$ the end of the shingles may be provided with a point more or less blunt, as may be desired.

In the modified construction of the machine illustrated in Figs. 7 and 8 a sliding carriage is mounted upon the adjustable guide-bar C, so that the carriage may be moved tangentially up to the cutter to form curved notches or scallops on the ends of the shingles, as shown in Fig. 9, or past the cutter to form a chamfered or pointed end on the shingle, as represented in Figs. 10 and 11.

When it is desired to scallop the ends of the shingles, the sliding carriage is arranged at right angles to the guide-bar, as represented in Fig. 7, and when it is desired to chamfer or point the shingles the carriage is arranged obliquely to the guide-bar, as represented in Fig. 8.

To enable the carriage to be adjusted to either of the above described positions, the same is provided on its under side with adjustable guide-blocks $l\ l$, bearing against opposite sides of the guide-bar C, the blocks being each removably attached to the carriage by a screw, as shown in Fig. 7.

When the carriage is used for scalloping the shingles, the guide-blocks are attached to the carriage transversely, as shown in Fig. 7, while when the carriage is used for chamfering or pointing the shingles they are attached thereto obliquely, as shown in Fig. 8, the fastening-screws of the blocks passing preferably through curved or oblique slots $m$ in the carriage, so that the degree of obliquity of the carriage may be varied to produce a chamfer or point of greater or less pitch.

When the carriage is slid upon the guide-bar, the adjustable pivot-support H is shifted out of the way, as shown in Figs. 7 and 8.

By my improved machine the ends of the shingle may be rounded, pointed, or chamfered to any desired extent, thus enabling the shingles to be trimmed to a variety of shapes.

I claim as my invention—

1. The combination, with the horizontal bed or table and the rotary horizontal cutter, of guides secured to the table, a guide-bar adjustable toward and from the cutter and provided with sleeves surrounding said guides, and a movable carriage or tray mounted upon said guide-bar, substantially as set forth.

2. The combination, with the bed or table and the rotary horizontal cutter, of a guide bar or way arranged tangentially to the cutter, and a tray or carriage pivoted to said guide-bar and made adjustable thereon lengthwise of the guide-bar, substantially as set forth.

3. The combination, with the bed or table and the rotary horizontal cutter, of a guide bar or way arranged tangentially to said cutter and made adjustable toward and from the same, and a tray or carriage having a pivot made adjustable on said guide-bar, substantially as set forth.

4. The combination, with the bed or table and the rotary longitudinal cutter, of a guide bar or way arranged tangentially to said cutter and made adjustable toward and from the same, and a tray or carriage having a pivot made adjustable on said guide-bar and provided with adjustable gages against which the shingle is placed, substantially as set forth.

Witness my hand this 5th day of April, 1890.

GEO. McBEAN.

Witnesses:
JOHN GILBERT,
WM. HACKBUSH.